United States Patent [19]
Wilson

[11] Patent Number: 5,881,545
[45] Date of Patent: Mar. 16, 1999

[54] RAKE AND A SHOVEL COMBINATION

[76] Inventor: Brian P. Wilson, 201 Leedom Way, Newton, Pa. 18940

[21] Appl. No.: 899,070

[22] Filed: Jul. 23, 1997

[51] Int. Cl.⁶ .................. A01D 7/10; A01B 1/20
[52] U.S. Cl. ..................... 56/400.12; 56/400.07; 294/50.9
[58] Field of Search ............ 56/400.12, 400.01, 56/400.04, 400.06, 400.07, 400.11, 400.16, 400.17, 400.21; 294/51, 50.9, 50.6, 58; 172/343, 374, 375

[56] References Cited

U.S. PATENT DOCUMENTS

| | | | |
|---|---|---|---|
| 391,078 | 10/1888 | Rieohen | 294/50.9 |
| 2,315,831 | 4/1943 | Wilcox | 294/51 X |
| 3,272,548 | 9/1966 | Taylor | 294/50.9 |
| 4,185,448 | 1/1980 | Blanko | 56/400.12 |
| 5,303,536 | 4/1994 | Tolliver | 56/400.12 |
| 5,564,267 | 10/1996 | Bricker et al. | 56/400.16 X |

FOREIGN PATENT DOCUMENTS

| | | | |
|---|---|---|---|
| 205159 | 12/1908 | Germany | 284/50.9 |
| 15598 | 12/1901 | Sweden | 294/50.9 |

Primary Examiner—Heather Shackelford

[57] ABSTRACT

A rake and shovel combination including an elongated post. Also included is a shovel coupled to an end of the post. A rake is pivotally coupled to the shovel. A control mechanism is provided for selectively pivoting the rake between an open and a closed orientation. When in the close orientation, the prongs of the rake extend past a front edge of the shovel.

8 Claims, 2 Drawing Sheets

RAKE AND A SHOVEL COMBINATION

BACKGROUND OF THE INVENTION

1. Field of the Invention

The present invention relates to a rake and shovel combination and more particularly pertains to providing a device that may be utilized as both a rake and a shovel.

2. Description of the Prior Art

The use of rake combinations is known in the prior art. More specifically, rake combinations heretofore devised and utilized for the purpose of accomplishing yard work are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,292,794; U.S. Pat. No. 5,303,536; U.S. Patent Des. 296,510; U.S. Pat. No. 4,185,448; U.S. Pat. No. 4,848,074; and U.S. Pat. No. 4,477,114.

In this respect, the rake and shovel combination according to the present invention substantially departs from the conventional concepts and designs of the prior art, and in so doing provides an apparatus primarily developed for the purpose of providing a device that may be utilized as both a rake and a shovel.

Therefore, it can be appreciated that there exists a continuing need for a new and improved rake and shovel combination which can be used for providing a device that may be utilized as both a rake and a shovel. In this regard, the present invention substantially fulfills this need.

SUMMARY OF THE INVENTION

In view of the foregoing disadvantages inherent in the known types of rake combinations now present in the prior art, the present invention provides an improved rake and shovel combination. As such, the general purpose of the present invention, which will be described subsequently in greater detail, is to provide a new and improved rake and shovel combination which has all the advantages of the prior art and none of the disadvantages.

To attain this, the present invention essentially comprises an elongated cylindrical post having a first end with a grip sleeve coupled thereto. The grip sleeve is equipped with a plurality of linear aligned undulations formed thereon. For reasons that will become apparent later, the elongated post further has a rectangular recess formed therein adjacent the first end thereof. As best shown in FIGS. 3 & 4, a shovel is defined by a planar plate with a rectangular configuration. The shovel includes a rear lip integrally coupled to a rear edge of the planar plate and extending upwardly therefrom. Associated therewith is a pair of side lips integrally coupled to side edges of the planar plate and extending upwardly therefrom. A top edge of each side lip tapers downwardly from the rear edge of the planar plate to a front edge thereof. Note FIG. 3. A mounting tube is integrally coupled to the rear lip of the shovel and extended rearwardly to receive a second end of the post. Next provided is a rake having a rectangular pivot member with a rear edge hingably coupled to a top edge of the rear lip of the shovel. The rake has a plurality of parallel and spaced prongs each having an inboard end integrally coupled to the pivot member. Each of the prongs is extended forwardly from the pivot member in coplanar relationship therewith. Further, each of the prongs has a downwardly extending tooth integrally coupled to an outboard end thereof. The pivot member has a fork coupled to a top surface thereof adjacent the rear edge. As shown in FIG. 1, a rake control assembly is provided including a T-shaped control handle. Such control handle is defined by a horizonal extent and a vertical extent integrally coupled to a central portion of the horizonal extent in perpendicular relationship therewith. The vertical extent has a fork coupled thereto at a central extent thereof. The vertical extent of the control handle is hingably coupled within the rectangular recess of the post such that the control handle is adapted to pivot forwardly and rearwardly. With reference still to FIG. 1, the control assembly further includes a rod having a first end hingably coupled to the fork of the rake and a second end hingably coupled to the fork of the vertical extent of the control handle. In use, the rake thus has an open orientation when the control member is pivoted rearwardly and a closed orientation when the control member is pivoted forwardly.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rake and shovel combination which has all the advantages of the prior art rake combinations and none of the disadvantages.

It is another object of the present invention to provide a new and improved rake and shovel combination which may be easily and efficiently manufactured and marketed.

It is a further object of the present invention to provide a new and improved rake and shovel combination which is of a durable and reliable construction.

An even further object of the present invention is to provide a new and improved rake and shovel combination which is susceptible of a low cost of manufacture with regard to both materials and labor, and which accordingly is then susceptible of low prices of sale to the consuming public, thereby making such rake and shovel combination economically available to the buying public.

Still yet another object of the present invention is to provide a new and improved rake and shovel combination which provides in the apparatuses and methods of the prior art some of the advantages thereof, while simultaneously overcoming some of the disadvantages normally associated therewith.

Still another object of the present invention is to provide a device that may be utilized as both a rake and a shovel.

Lastly, it is an object of the present invention to provide a new and improved rake and shovel combination including an elongated post. Also included is a shovel coupled to an end of the post. A rake is pivotally coupled to the shovel. A control mechanism is provided for selectively pivoting the rake between an open and a closed orientation. When in the close orientation, the prongs of the rake extend past a front edge of the shovel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
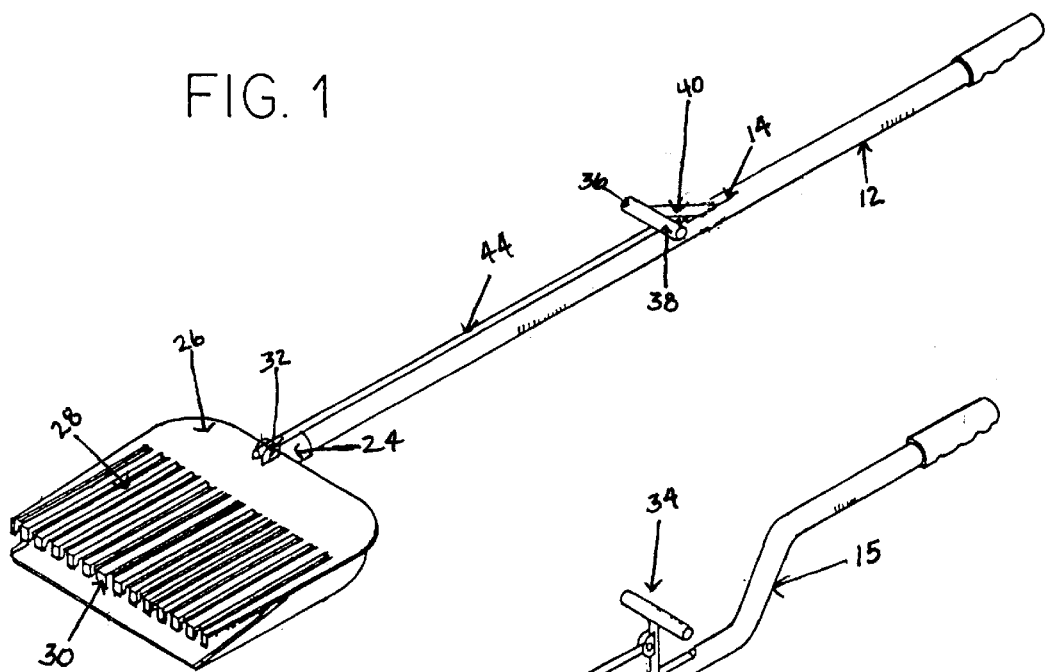
FIG. 1 is a perspective illustration of the preferred embodiment of the rake and shovel combination constructed in accordance with the principles of the present invention.

With reference now to the drawings, and in particular to FIG. 1 thereof, a new and improved rake and shovel combination embodying the principles and concepts of the present invention and generally designated by the reference numeral 10 will be described.

The present invention, the new and improved rake and shovel combination, is comprised of a plurality of components. Such components in their broadest context include a handle post, a shovel, a rake, and a control assembly. Such components are individually configured and correlated with respect to each other so as to attain the desired objective.

More specifically, it will be noted that the system 10 of the present invention includes an elongated linear cylindrical handle post 12 having a first end with a grip sleeve coupled thereto. The grip sleeve is equipped with a plurality of linear aligned undulations formed thereon. For reasons that will become apparent later, the elongated post further has a rectangular recess 14 formed therein adjacent the first end thereof. Such recess resides on a side of the post opposite that which the undulations of the grip reside.

Figure 2:
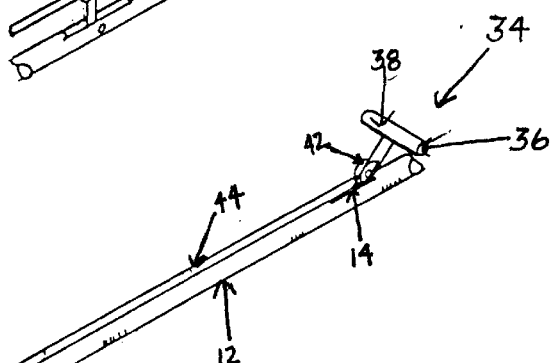
FIG. 2 is a perspective view of an alternate embodiment of the present invention.

As shown in FIG. 2, an alternate form of the post is disclosed. In such embodiment, a portion 15 of the post between the first end and the recess is offset and parallel with the remaining portion of the post.

Figure 3:
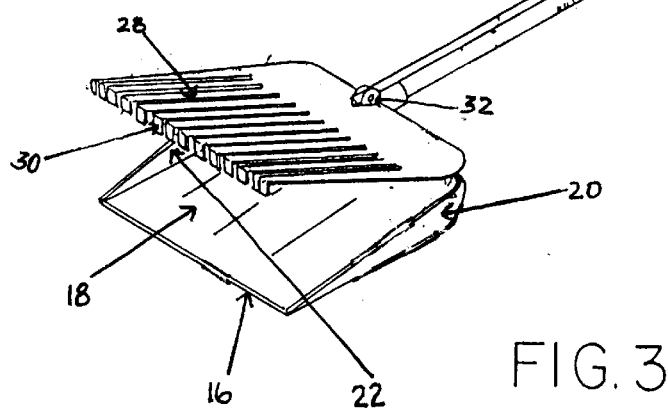
FIG. 3 is a perspective view of the present invention with the rake in an open orientation.
Figure 4:
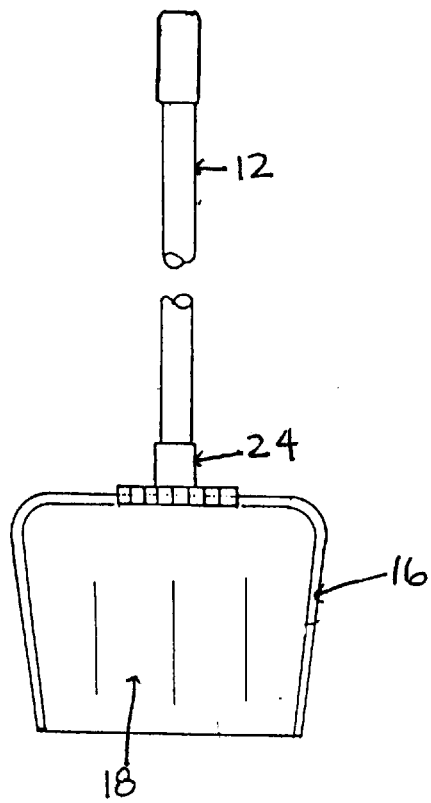
FIG. 4 is a top view of the shovel of the present invention.
Figure 5:
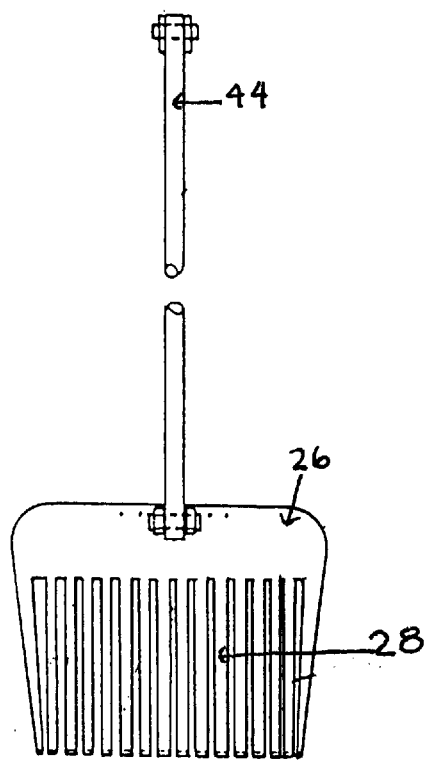
FIG. 5 is a top view of the rack and rake control assembly of the present invention.
Figure 6:
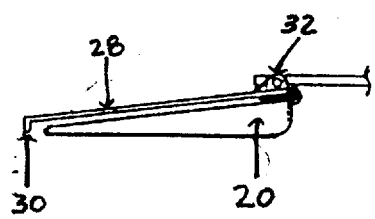
FIG. 6 is a side view of the rake in a closed orientation.

As best shown in FIGS. 3 & 4, a shovel 16 is defined by a planar plate 18 with a rectangular configuration. The shovel includes a linear rear lip integrally coupled to a rear edge of the planar plate and extending upwardly therefrom. Associated therewith is a pair of linear side lips 20 integrally coupled to side edges of the planar plate and extending upwardly therefrom. A top edge 22 of each side lip tapers downwardly from the rear edge of the planar plate to a front edge thereof. Note FIG. 3. As shown in FIG. 4, such side lips further extend inwardly from the rear edge of the planar plate. A mounting tube 24 is integrally coupled to the rear lip of the shovel and extended rearwardly to receive a second end of the post.

Next provided is a rake 26 having a rectangular solid pivot member with a rear edge hingably coupled via a hinge to a top edge of the rear lip of the shovel. As shown in the figures, the pivot member defines an area of about ¼ that of the planar plate of the shovel. The rake has a plurality of parallel and spaced linear prongs 28 each having an inboard end integrally coupled to the pivot member. Each of the prongs is extended forwardly from the pivot member in coplanar relationship therewith. Further, each of the prongs has a downwardly extending tooth 30 integrally coupled to an outboard end thereof. The pivot member has a fork 32 coupled to a top surface thereof adjacent the rear edge.

As shown in FIG. 1, a rake control assembly 34 is provided including a T-shaped control handle 36. Such control handle is defined by a horizonal extent 38 and a vertical extent 40 integrally coupled to a central portion of the horizonal extent in perpendicular relationship therewith. The vertical extent has a fork 42 coupled thereto at a central extent thereof. The vertical extent of the control handle is hingably coupled within the rectangular recess of the post such that the control handle is adapted to pivot forwardly and rearwardly. With reference still to FIG. 1, the control assembly further includes a rod 44 with a less than that of the handle post. The rod has a first end hingably coupled to the fork of the rake and a second end hingably coupled to the fork of the vertical extent of the control handle. The rod is positioned in parallel with the handle post. In the preferred embodiment, the various components of the present invention are constructed from a light weight plastic such as polypropylene.

In use, the rake thus has an open orientation when the control member is pivoted rearwardly and a closed orientation when the control member is pivoted forwardly. It is imperative that the rake extend past a front edge of the shove at least 2 inches when in the close orientation. In the closed orientation, the device may thus be utilized as a rake.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved rake and shovel combination comprising, in combination:

an elongated cylindrical post having a first end with a grip sleeve coupled thereto, the grip sleeve having a plurality of linear aligned undulations formed thereon, the elongated post further having a rectangular recess formed therein adjacent the first end thereof;

a shovel defined by a planar plate with a rectangular configuration, a rear lip integrally coupled to a rear edge of the planar plate and extending upwardly therefrom, a pair of side lips integrally coupled to side edges of the planar plate and extending upwardly therefrom wherein a top edge of each side lip tapers downwardly from the rear edge of the planar plate to a front edge thereof, and a mounting tube integrally coupled to the rear lip of the shovel and extending rearwardly to receive a second end of the post;

a rake having a rectangular pivot member with a rear edge hingably coupled to a top edge of the rear lip of the shovel, the rake having a plurality of parallel and spaced prongs each having an inboard end integrally coupled to the pivot member and extending forwardly therefrom in coplanar relationship with the pivot member, each of the prongs having a downwardly extending tooth integrally coupled to an outboard end thereof, the pivot member having a fork coupled to a top surface thereof adjacent the rear edge; and a rake control assembly including a T-shaped control handle with a horizonal extent and a vertical extent integrally coupled to a central portion of the horizonal extent in perpendicular relationship therewith with the vertical extent having a fork coupled thereto at a central extent thereof, the vertical extent of the control handle hingably coupled within the rectangular recess of the post such that the control handle is adapted to pivot forwardly and rearwardly, the control assembly further including a rod having a first end hingably coupled to the fork of the rake and a second end hingably coupled to the fork of the vertical extent of the control handle;

whereby the rake has an open orientation when the control member is pivoted rearwardly and a closed orientation when the control member is pivoted forwardly, wherein the rake extends past a front edge of the shove when in the close orientation.

2. A rake and shovel combination comprising:

an elongated post;

a shovel coupled to an end of the post;

a rake pivotally coupled to the shovel so as to pivot between a closed and open orientation, having a fork located proximate the end of the post wherein the rake extends past a front edge of the shovel when in the closed orientation; and a rake control assembly including a control handle hingably coupled within a recess of the post such that the control handle is adapted to pivot forwardly and rearwardly, the rake control assembly further including a rod located exterior of the post having a first end hingably coupled to the fork mounted on the rake and a second end hingably coupled to the control handle, wherein a user may pivot the control handle to shift the rake between the closed and open orientations thereof.

3. A rake and shovel combination as set forth in claim 2 wherein the rake has a rectangular pivot member with a rear edge hingably coupled to the shovel, the rake having a plurality of parallel and spaced prongs each having an inboard end integrally coupled to the pivot member and extending forwardly therefrom in coplanar relationship with the pivot member.

4. A rake and shovel combination as set forth in claim 2 wherein the rake has prongs each with a downwardly extending tooth integrally coupled to an outboard end thereof.

5. A rake and shovel combination as set forth in claim 2 wherein the post has a grip coupled thereto.

6. A rake and shovel combination as set forth in claim 2 wherein the shovel is defined by a planar plate with a rear lip integrally coupled to a rear edge of the planar plate and extending upwardly therefrom, a pair of side lips integrally coupled to side edges of the planar plate and extending upwardly therefrom wherein a top edge of each side lip tapers downwardly from the rear edge of the planar plate to a front edge thereof.

7. A rake and shovel combination as set forth in claim 2 wherein a portion of the post is offset and parallel with the remaining portion of the post.

8. A rake and shovel combination as set forth in claim 2 wherein the post is linear along an entire length thereof.

\* \* \* \* \*